United States Patent
Vollebregt et al.

(10) Patent No.: US 10,493,520 B2
(45) Date of Patent: Dec. 3, 2019

(54) UNIT FOR MOULDING A TURBOMACHINE BLADE, COMPRISING A RAISED PORTION WITH A LARGE CROSS-SECTION

(71) Applicant: SAFRAN AIRCRAFT ENGINES, Paris (FR)

(72) Inventors: Matthieu Jean Luc Vollebregt, Asnieres sur Seine (FR); Charlotte Marie Dujol, Le Mee sur Seine (FR); Patrice Eneau, Moissy-Cramayel (FR); Coralie Geurard, Colombes (FR); Patrick Emilien Paul Emile Huchin, Tessancourt sur Aubette (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 79 days.

(21) Appl. No.: 15/740,693

(22) PCT Filed: Jun. 27, 2016

(86) PCT No.: PCT/FR2016/051581
§ 371 (c)(1),
(2) Date: Dec. 28, 2017

(87) PCT Pub. No.: WO2017/001752
PCT Pub. Date: Jan. 5, 2017

(65) Prior Publication Data
US 2018/0318913 A1   Nov. 8, 2018

(30) Foreign Application Priority Data

Jun. 29, 2015 (FR) .................................. 15 56069

(51) Int. Cl.
*B22C 9/10* (2006.01)
*F01D 5/18* (2006.01)
*F01D 5/20* (2006.01)

(52) U.S. Cl.
CPC .............. *B22C 9/103* (2013.01); *F01D 5/186* (2013.01); *F01D 5/20* (2013.01); *F05D 2230/21* (2013.01);
(Continued)

(58) Field of Classification Search
CPC ........................... B22C 9/103; F05D 2230/21
See application file for complete search history.

(56) References Cited

U.S. PATENT DOCUMENTS

| 2007/0261811 A1 | 11/2007 | Guerche et al. |
| 2008/0080979 A1 | 4/2008 | Brassfield et al. |

(Continued)

FOREIGN PATENT DOCUMENTS

| FR | 2977510 A1 | 1/2013 |
| WO | 2015020720 A2 | 2/2015 |
| WO | 2017001751 A1 | 1/2017 |

OTHER PUBLICATIONS

Search Report for FR 1556069 dated Apr. 27, 2016.
International Search Report for PCT/FR2016/051581 dated Dec. 19, 2016.

*Primary Examiner* — James Sanders
(74) *Attorney, Agent, or Firm* — Pearne & Gordon LLP

(57) ABSTRACT

A moulding unit for producing a turbomachine blade blank. The moulding unit has an upstream portion and a downstream portion. According to the invention, the moulding unit comprises a raised portion designed to form a downstream opening which, at the level of the trailing edge, passes through at least one of the side edges of the basin-like portion at the blade tip. The raised portion rigidly secures the upstream portion to the downstream portion and comprises a strengthening protuberance extending in the transverse direction.

9 Claims, 3 Drawing Sheets

(52) U.S. Cl.
CPC ....... *F05D 2240/307* (2013.01); *Y02T 50/676* (2013.01)

(56) References Cited

U.S. PATENT DOCUMENTS

| | | |
|---|---|---|
| 2010/0303625 A1 | 12/2010 | Kuhne et al. |
| 2016/0208622 A1* | 7/2016 | Ahmad .................. F01D 5/187 |
| 2016/0375610 A1 | 12/2016 | Vollebregt et al. |
| 2017/0037733 A1 | 2/2017 | Dujol et al. |
| 2017/0183969 A1 | 6/2017 | Dujol et al. |
| 2017/0183970 A1 | 6/2017 | Dujol et al. |
| 2017/0191368 A1 | 7/2017 | Dujol et al. |

\* cited by examiner

UNIT FOR MOULDING A TURBOMACHINE BLADE, COMPRISING A RAISED PORTION WITH A LARGE CROSS-SECTION

CROSS-REFERENCE TO RELATED APPLICATIONS

This is a National Stage application of PCT international application PCT/FR2016/051581, filed on Jun. 27, 2016, which claims the priority of French application no. 15 56069 entitled "UNIT FOR MOULDING A TURBOMACHINE BLADE, COMPRISING A RAISED PORTION WITH A LARGE CROSS-SECTION", filed Jun. 29, 2015, both of which are incorporated herein by reference in their entirety.

TECHNICAL FIELD

The invention relates to the production of a turbomachine-type motor vane for an aircraft such as a turbojet engine or a turboprop engine.

PRIOR ART

As shown in FIG. 1, a front portion of a bypass turbojet engine 1 comprises an inlet sleeve 2 into which air is admitted before being aspirated by the blades of a fan 3. After having passed through the fan region, the air is split into a central primary flow and a secondary flow which surrounds the primary flow.

The primary flow is compressed by compressors 4 and 6 before reaching a combustion chamber 7, after which it is expanded by passing through turbines 8, before being discharged while generating thrust. The secondary flow is directly propelled by the fan to generate additional thrust.

The compressors 4, 6 and the turbine 8 comprise radially-oriented vanes evenly spaced about a rotating shaft of the motor having an axis AX, whereby an outer casing 9 surrounds the motor assembly.

The vanes are cooled by circulating air in each vane, which air is sourced upstream of the combustion and enters at the vane base, said air being discharged through piercings made through the walls of said vanes.

Such a vane, shown under the reference numeral 11 in FIG. 2, comprises a base P through which it is secured to a rotary body, and a blade 12 supported by said base P, the base and the blade being separated by a platform 13.

The blade 12 has a free-form shape twisted about a so-called spanwise axis EV. The spanwise axis EV is generally perpendicular to the rotational axis AX. The spanwise axis EV is perpendicular to an axis AS in the direction of the framework of the vane 11. The direction of the framework of the vane 11 or the longitudinal direction AS of the vane traditionally corresponds to the median curve of the vane 11 from the leading edge 17 to the trailing edge 18 situated downstream of the leading edge 17.

The vane 11 comprises a base via which it is connected to the platform 13 and which extends in the spanwise direction EV as far as a tip S which is the free end of said blade. The two main walls of the blade are the pressure-face wall 14 thereof and the suction-face wall thereof, not shown in FIG. 2, which are transversally spaced apart from each other, in the running portion of the vane, in a transverse direction AT that is orthogonal to the spanwise direction EV and to the longitudinal direction AS. The pressure-face wall 14 and the suction-face wall join at the level of the trailing edge 18.

The tip S of the vane 11 comprises a transverse closing wall which connects the pressure-face and suction-face walls. This closing wall is not shown in FIG. 2 and is set back towards the axis AX relative to the free edges of the pressure-face and suction-face walls. It defines, in conjunction with said edges, a hollow portion that is open in the opposite direction to the axis AX, called a basin 30, shown by dotted lines in FIG. 2 and which is situated in the region of the vane tip S.

The leading edge 17 is convex and the trailing edge 18 has a tapered shape. It comprises a series of cooling slots 20. Said slots 20 have short lengths and are arranged in the spanwise direction EV between a first slot 21, arranged in the vicinity of the platform 13, and a last slot 25, arranged in the vicinity of the tip S. The slots situated between the first slot 21 and the last slot 25 are called intermediate slots 22 in the description hereinbelow. The slots 20 are spaced apart from each other while being situated in the extension of each other at a short distance from the trailing edge 18.

Each slot 20 passes through the wall of the vane to circulate cooling air from inside said vane 11 and blow it onto the pressure-face wall 14 at the level of the trailing edge 18. Moreover, the trailing edge 18 is provided with outer ribs oriented such that they are parallel to the axis AS in order to channel the cooling air originating from said slots.

In a conventional manner, the air flows in an upstream to downstream direction relative to the vane, i.e. from the leading edge towards the trailing edge of the blade of the vane. The terms "upstream" and "downstream" used hereinbelow are understood as also describing the mould core portions designed to produce the part by casting.

Such a vane 11 is manufactured by moulding a metal material, using one or more cores, in order to define the inner space thereof, whereby the basin and different portions of said vane have complex shapes.

In general, it appears that the mechanical strength of the moulding unit is unsatisfactory.

The invention is based on the finding that the region of the moulding unit comprising strips intended to form the vane cooling slots constitutes a fragile area of the moulding unit.

The purpose of the invention is to at least partially overcome the problems encountered in the solutions of the prior art.

DESCRIPTION OF THE INVENTION

In this respect, the invention relates to a moulding unit for producing a turbomachine vane blank, the vane blank comprising a blade extending in a so-called spanwise direction, the blade extending in a longitudinal direction from a leading edge as far as a trailing edge, the blade comprising a pressure-face side wall and a suction-face side wall spaced apart from each other in the running portion of the vane in a transverse direction and each connecting the leading edge to the trailing edge, at least one of the side walls being passed through at the level of the trailing edge by cooling slots spaced apart from each other in the spanwise direction, the blade comprising a tip which includes a cavity in the shape of a basin, the basin comprising a downstream opening passing through at least one of the side walls as far as the trailing edge, the moulding unit having an upstream portion, a downstream portion and a raised portion rigidly securing the upstream portion to the downstream portion, the raised portion being configured with a strengthening protuberance extending at least in the transverse direction in order to form the downstream opening once the vane has been manufactured.

The moulding unit has a satisfactory mechanical strength, while allowing the air flow to be suitably distributed between the cooling slots. In particular, the moulding unit allows for an improved distribution of the cooling air flow compared to a moulding unit with an enlarged cross-sectional area of at least one strip in order to form a cooling slot.

Advantageously, the downstream portion is rigidly secured to the upstream portion by strips and by the raised portion, the strips being oriented in the longitudinal direction and spaced apart from each other in the spanwise direction in order to form the cooling slots by moulding, the raised portion being configured such that it forms the downstream opening, and having a cross-sectional area that is greater than a cross-sectional area of at least one of the strips.

The invention further relates to a moulding unit as defined hereinabove, wherein the raised portion has a thickness, in a transverse direction of the moulding unit, that is greater than a thickness of at least one of the strips, in the transverse direction of the moulding unit.

The invention further relates to a moulding unit as defined hereinabove, wherein the raised portion has a height, in a spanwise direction of the moulding unit, that is greater than a height of at least one of the strips, in the spanwise direction of the moulding unit.

The invention further relates to a moulding unit as defined hereinabove, comprising an upper strip configured such that it forms the cooling slot the closest to the tip, the raised portion having a thickness that is greater than the thickness of the upper strip and/or the raised portion having a height that is greater than the height of the upper strip.

The invention further relates to a moulding unit as defined hereinabove, wherein the raised portion has a cross-sectional area that is greater than the cross-sectional area of all of the strips, with the possible exception of that of the lower strip.

The invention further relates to a moulding unit as defined hereinabove, wherein the region of maximum thickness of the first portion is offset in the longitudinal direction relative to at least one of the strips. In this configuration, the torsional stresses about the spanwise direction exerted on the strips are capable of being reduced further.

The invention further relates to a moulding unit as defined hereinabove, wherein the raised portion is situated above the upper strip in the spanwise direction, and is spaced apart from the strips.

The invention further relates to a moulding unit as defined hereinabove, wherein one of either the upstream portion or the downstream portion is made in one piece.

The invention further relates to a method for manufacturing a turbomachine vane, comprising a step of manufacturing, by casting, a vane blank in a moulding unit as defined hereinabove.

The invention further relates to a turbomachine vane capable of being manufactured according to a method as defined hereinabove, the vane comprising a platform, a tip and a blade extending in a spanwise direction of the vane from the platform as far as the tip, the blade extending in a longitudinal direction of the vane from a leading edge as far as a trailing edge, the blade comprising a pressure-face side wall and a suction-face side wall spaced apart in a transverse direction of the vane and each connecting the leading edge to the trailing edge, at least one of the side walls being passed through at the level of the trailing edge by a plurality of cooling slots spaced apart from each other in the spanwise direction, characterised in that the cooling slot the closest to the tip has a cross-sectional area that is less than a cross-sectional area of at least one of the cooling slots.

BRIEF DESCRIPTION OF THE FIGURES

This invention will be better understood after reading the following description of embodiments, which is made with reference to the figures.

DETAILED DESCRIPTION OF THE SPECIFIC EMBODIMENTS

In the following description, the terms "upper" and "lower" are understood according to the layout of the drawings. Unless specified otherwise, the terms lower and upper are used with reference to the direction of the rotational axis AX such that the lower portion of an element is closer to the rotational axis AX than the upper portion of the same element.

Figure 1:
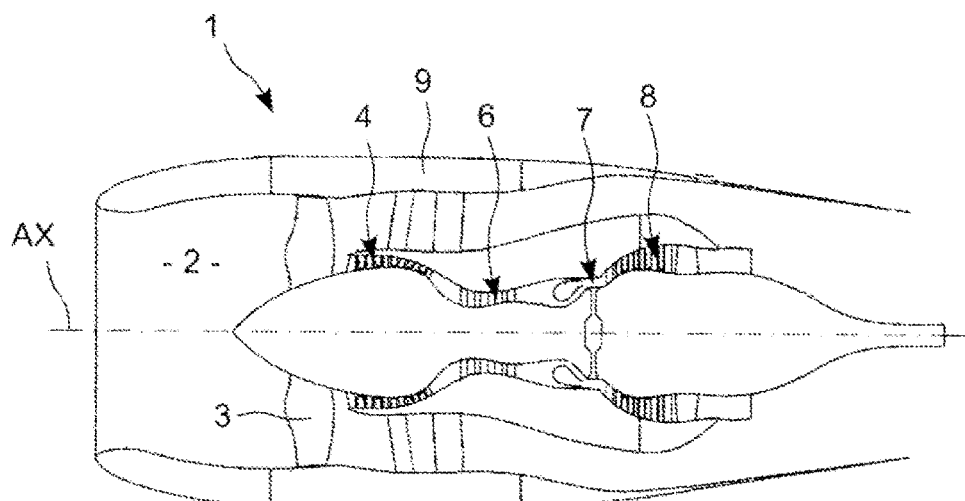
FIG. 1 is a longitudinally-sectional diagrammatic view of a bypass turbojet engine.
Figure 2:
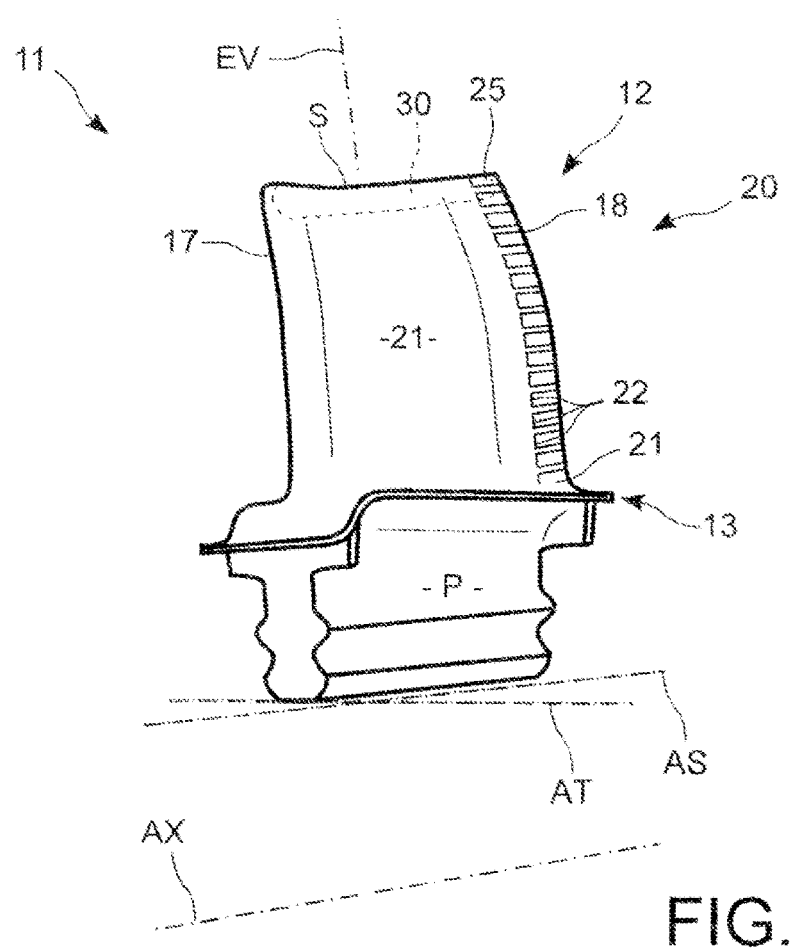
FIG. 2 is a perspective diagrammatic view of a turbine vane of the turbojet engine.
Figure 3:
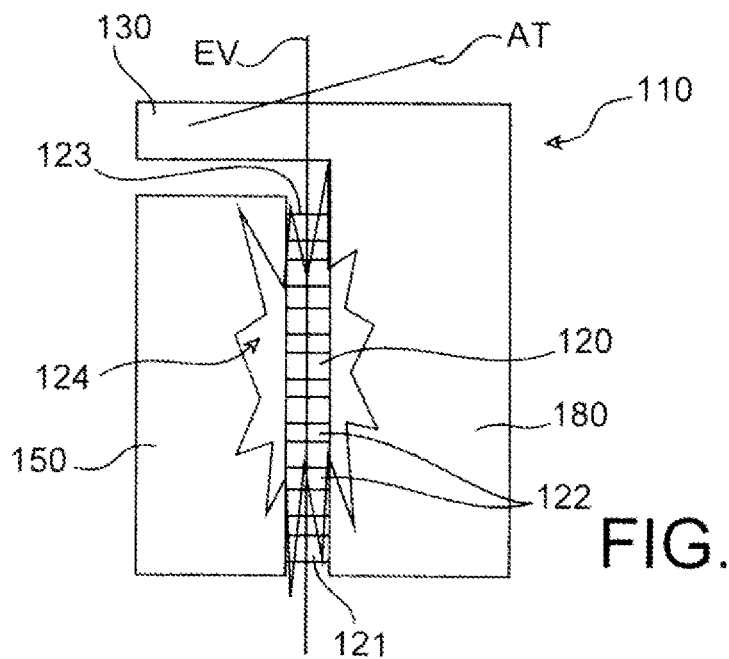
FIG. 3 diagrammatically illustrates a set of cores for moulding a vane.

A set of cores 110 is shown in FIG. 3. It comprises a basin core 130, a downstream manifold core 150 and a trailing edge core 180. The basin is moulded using the basin core 130. The downstream manifold core 150 is configured such that it forms a trailing edge inner cavity intended to supply cooling air to the slots 20. The trailing edge core 180 is used to produce the trailing edge 18 and the cooling slots 20.

The trailing edge core 180 is rigidly secured to the downstream manifold core 150 by strips 120 designed to delimit the cooling slots 20.

The raised shapes shown in the figures produce the hollow shapes of a vane blank and vice-versa. Such a vane blank is obtained by casting using the moulding unit.

In general, the spanwise direction EV of the moulding unit corresponds to the spanwise direction EV of the vane blank, as well as to the spanwise direction EV of the vane. Similarly, the longitudinal direction AS of the moulding unit and the transverse direction AT of the moulding unit correspond to those of the vane blank and of the vane 11.

In particular, the longitudinal direction AS corresponds to the median curve extending from the leading edge to the trailing edge. It is different from a straight line due to the twisted shape of the vane 11 about its spanwise direction EV. The transverse direction AT is locally orthogonal to these two latter directions EV, AS.

The strips 120 include a lower strip 121, arranged opposite the basin core 130, an upper strip 123, arranged in the vicinity of the basin core 130, and intermediate strips 122 spaced apart from each other in the spanwise direction EV between the lower strip 121 and the upper strip 123. The lower strip 121 is used to form the first slot 21, the upper strip 123 is used to form the last slot 25, and the intermediate strips 122 are used to form the other cooling slots 22.

The invention is based on the finding according to which the strips 120 constitute a region of low mechanical strength of the set of cores 110 when assembled. More specifically, the majority of the strips 120 have a low height $h_2$ along the axis EV and a low thickness in the transverse direction AT. As a result, the set of cores 110 has a low mechanical strength in the connecting region 124 connecting the downstream manifold core 150 to the trailing edge core 180.

According to the invention, the stiffness of the moulding unit is strengthened downstream of the core portion forming the basin.

Figure 4:
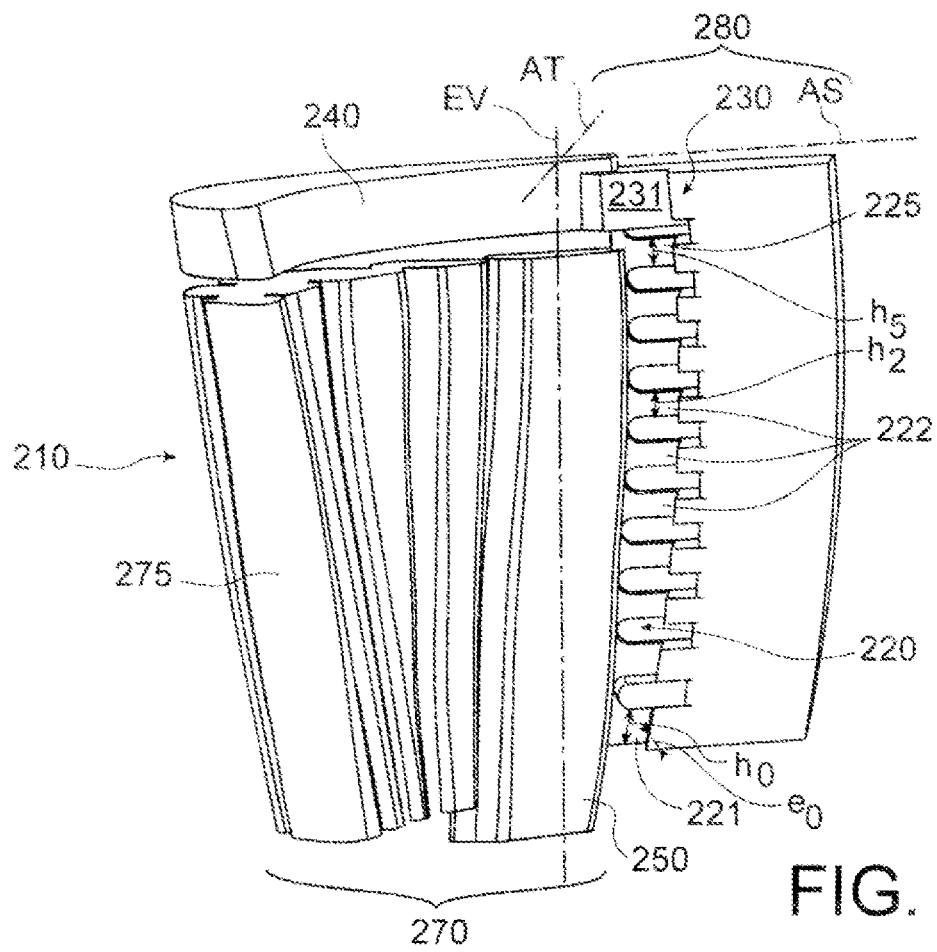
FIG. 4 is a partial diagrammatic view of a moulding unit according to the invention.
Figure 5:
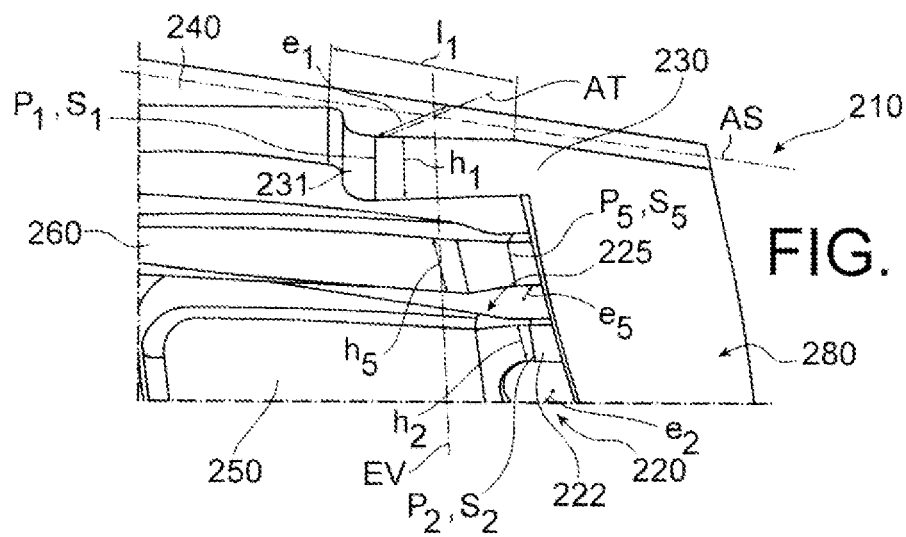
FIG. 5 is a partial view of one feature of the moulding unit according to the invention.

With reference to FIGS. 4 and 5, the moulding unit 210 comprises a core comprising an upstream portion 270 and a downstream portion 280 rigidly secured to the upstream portion. The upstream portion 270 constitutes a first portion of the moulding unit 210, whereby the downstream portion 280 constitutes a second portion of the same unit.

The moulding unit 210 comprises an upper portion 230 mechanically connecting in a rigid manner the upstream portion 270 to the downstream portion 280.

Figure 7:
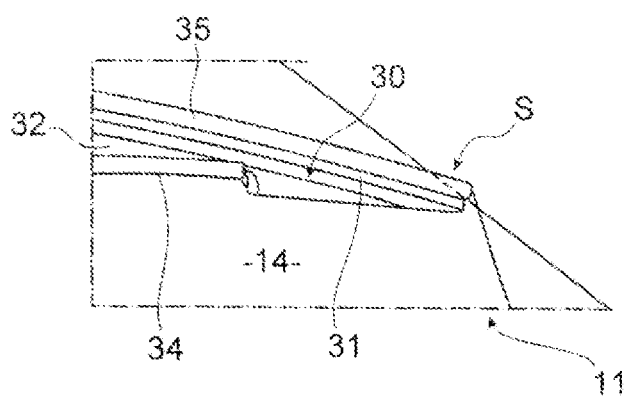
FIG. 7 is a diagrammatic view of a type of turbomachine vane preferably manufactured using the moulding unit according to the invention.

The upper portion 230 comprises a raised portion 231 configured such that it forms, by moulding, the downstream opening 31 of the basin 30 shown in FIG. 7. The raised portion 231 is situated above the strips 220 in the spanwise direction, spaced apart from the strips 220.

The raised portion 231 has a general bulb-like shape with a protuberance for strengthening the moulding unit at least in the transverse direction AT. The raised portion 231 has an upper surface and a lower surface spaced apart from each other in the spanwise direction EV, the two surfaces extending substantially along the plane formed by the directions AS and AT in a substantially planar manner.

The strips 220 form a part of the downstream portion 280 of the moulding unit. The strips 220 are spaced apart from each other in the spanwise direction EV and are oriented in the longitudinal direction AS.

In a similar manner to that disclosed in FIG. 3, the strips 220 are intended to form the cooling slots 20. The strips 220 include a lower strip 221, an upper strip 225, and intermediate strips 222 spaced apart from each other in the spanwise direction EV between the lower strip 221 and the upper strip 225. The lower strip 221 is used to form the first slot 21, the upper strip 225 is used to form the last slot 25, and the intermediate strips 222 are used to form the intermediate slots 22. The last slot 25 is the cooling slot of the trailing edge the closest to the tip S.

The upstream portion 270 comprises a third portion 240 and a fourth portion 250. The third portion 240 is situated upstream of the upper portion 230 in the longitudinal direction AS, i.e. towards the leading edge 17, once the vane 11 has been moulded. It is rigidly secured to the upper portion 230 by the raised portion 231. The downstream portion 280 is secured to the third portion 240 via the upper portion 230.

The third portion 240 is intended to form the basin 30, situated in the region of the tip S of the vane 11, above the cooling slots 20, with the exception of the downstream opening 31.

The fourth portion 250 is rigidly secured to the downstream portion 280, to which it is mechanically connected by the strips 220. It is designed to produce a trailing edge inner cavity 50, shown in FIG. 6, situated inside the blade 12. Said inner cavity has the shape of a downstream manifold channeling the cooling air in the spanwise direction EV. It supplies cooling air both to the first slot 21 and to the intermediate slots 22 from the base P of the vane 11.

The core element 260, shown in FIG. 5, is designed to create a cavity supplying cooling air in an independent manner to the last slot 25. Said cavity is also called a sub-basin cavity. Therefore, the core element 260 is separated from the fourth portion 250 and is distanced therefrom. The core element 260 also forms a part of the upstream portion 270.

Finally, the upstream portion 270 comprises a fifth portion 275, shown in FIG. 4, situated upstream of the fourth portion 250 in the longitudinal direction AS. Said fifth portion of the core is configured such that it forms an upstream manifold for supplying cooling air to the leading edge 17.

In order to increase the mechanical strength of the moulding unit 210, the raised portion 231 has a cross-sectional area $S_1$, shown in FIG. 5, that is significantly greater than the cross-sectional area $S_2$ of each intermediate strip 222.

The maximum cross-sectional area $S_1$ of the raised portion 231 lies in a first transverse plane $P_1$. Said area $S_1$ is also greater than the maximum cross-sectional area $S_5$ of the upper strip 225. The cross-sectional area $S_5$ of the upper strip 225 lies in a plane $P_5$. Said plane $P_5$ is offset in the longitudinal direction AS of the moulding unit in a downstream direction relative to the first plane $P_1$.

The maximum cross-sectional area $S_2$ of the intermediate strips 222 is substantially equal to that $S_5$ of the upper strip 225. Moreover, the plane $P_2$, in which the cross-sections $S_2$ and the plane $P_5$ lie, merge or almost merge.

The raised portion 231, in the lower portion thereof, takes on the shape of the downstream opening 31. The upper portion of the raised portion 231 is in particular intended to constitute the portion of the vane blank situated at the level of the tip of the vane 11.

Therefore, the height $h_1$ of the raised portion 231 can be relatively freely increased, in order to improve the mechanical strength of the moulding unit 210. The height $h_1$ of the raised portion 231 is greater than that $h_5$ of the upper strip 225 and those $h_2$ of the intermediate strips 222. The heights $h_1$, $h_2$, $h_5$ are measured in the spanwise direction EV, in particular in the planes $P_1$, $P_2$ and $P_5$.

The raised portion 231 has a first thickness $e_1$ in the transverse direction AT which is greater than a thickness $e_2$ of at least one of the strips 222. The thicknesses $e_1$ and $e_2$ are measured in the transverse direction AT, preferably at the level of the maximum thickness of the first portion 231 and of the intermediate strips 222. The thickness $e_1$ is measured in the plane $P_1$.

Similarly, the thickness $e_5$ of the last strip 225 is substantially equal to that $e_2$ of the intermediate strips 222. The first thickness $e_1$ is greater than that $e_5$ of the upper strip 225.

The lower strip 221 has a height $h_0$, a thickness $e_0$, and more generally a cross-sectional area $S_0$, greater than those of the intermediate strips 222 and of the upper strip 225, in order to increase the mechanical strength of the moulding unit 210.

Figure 6:
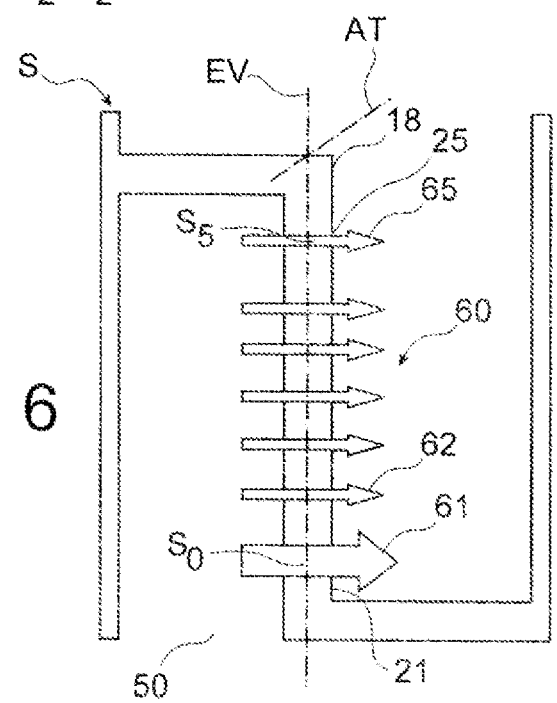
FIG. 6 is a partial diagrammatic view of a vane blank obtained by moulding according to the invention.

As a result, with reference to FIG. 6, the air flow rate 61 flowing through the first slot 21 is greater than the air flow rate 62 at the level of the intermediate slots 22 and than the flow rate 65 passing through the last slot 25. The air flow rates 62 and 65 passing through the intermediate slots 22 and the last slot 25 are of the same order of magnitude.

The vane 11 shown in FIG. 7 comprises a cavity in the shape of a basin 30 in the region of the tip S. The basin 30 is defined laterally by a pressure-face edge 34 and by a suction-face edge 35, which respectively form the upper ends of the pressure-face wall 14 and of the suction-face wall.

The basin 30 comprises a bottom 32 which connects the pressure-face edge 34 to the suction-face edge 35 in the transverse direction AT, and which closes the tip S of the vane in the spanwise direction EV. The basin 30 comprises a downstream opening 31 passing through at least one of the side walls to the trailing edge 18, in particular the pressure-face wall 14, as shown in FIG. 7.

The raised portion 231 improves the mechanical strength of the moulding unit 210 and is used to directly produce the downstream opening 31 that opens out at the level of the trailing edge 18 through the pressure-face edge 34 of the basin.

In general, it is all the more important for the thickness $e_1$ of the raised portion 231 to be significant relative to the height $h_1$ thereof, as the moulding unit 210 is particularly susceptible to damage by torsion about an axis extending in the spanwise direction EV at the level of the strips 220. In such a case, the raised portion improves the mechanical strength of the moulding unit 210 to an even more significant degree.

The raised portion 231 has the advantage of allowing for the possibility of reducing the cross-sectional area $S_5$ of the last slot 25, without compromising the mechanical strength of the moulding unit to produce the vane blank. The overall distribution of the cooling air flow 60 through the slots 20 can thus be improved.

The upper portion 230, the third portion 240, the fourth portion 250 and the fifth portion 275 are each formed in one piece. Alternatively, each of said portions can comprise a plurality of cores. More generally, the moulding unit can be constituted from a single core or from a plurality of cores secured to each other. Such cores are generally made of ceramic.

Moreover, the cross-sectional area $S_1$ of the raised portion is preferably greater than that $S_0$ of the lower strip. Alternatively, it can be substantially less than or equal thereto, depending on the overall mechanical strength of the moulding unit 210.

The moulding unit 210 is not required to comprise a separate core element 260 for supplying cooling air to the last slot 25 individually from the other cooling slots 21, 22. In such a case, the fourth portion 250 extends in the spanwise direction EV such that it supplies cooling air to the last slot 25.

Moreover, the third core portion 240 shown in FIG. 4 extends above the fourth portion 250 and the fifth portion 275. Alternatively, the third portion 240, used as a core for the basin, can extend solely in the downstream portion of the vane in the longitudinal direction AS.

What is claimed is:

1. A moulding unit for producing a turbomachine vane blank,
   the vane blank comprising a blade extending in a so-called spanwise direction, the blade extending in a longitudinal direction from a leading edge as far as a trailing edge,
   the blade comprising a pressure-face side wall and a suction-face side wall which are spaced apart from each other in the running portion of the vane in a transverse direction, and wherein the pressure-face side wall and the suction-face side wall are each connecting the leading edge to the trailing edge,
   wherein at least one of the side walls is passed through at the level of the trailing edge by cooling slots which are spaced apart from each other in the spanwise direction,
   the blade comprising a tip which includes a cavity in the shape of a basin, wherein the cavity in the shape of a basin comprises a downstream opening passing through at least one of the side walls as far as the trailing edge,
   wherein the moulding unit has an upstream portion, a downstream portion and a raised portion rigidly securing the upstream portion to the downstream portion, wherein said raised portion is configured with a strengthening protuberance extending at least in the transverse direction in order to form the downstream opening once the vane has been manufactured.

2. The moulding unit according to claim 1, wherein the downstream portion is rigidly secured to the upstream portion by strips and by the raised portion,
   wherein the strips are oriented in the longitudinal direction and wherein the strips are spaced apart from each other in the spanwise direction in order to form the cooling slots by moulding,
   wherein the raised portion is configured such that it forms the downstream opening, and wherein the raised portion has a cross-sectional area that is greater than a cross-sectional area of at least one of the strips.

3. The moulding unit according to claim 1, wherein the raised portion has a thickness, in a transverse direction of the moulding unit, that is greater than a thickness of at least one of the strips, in the transverse direction of the moulding unit.

4. The moulding unit according to claim 2, wherein the raised portion has a height, in a spanwise direction of the moulding unit, that is greater than a height of at least one of the strips, in the spanwise direction of the moulding unit.

5. The moulding unit according to claim 2, comprising an upper strip configured such that it forms the cooling slot the closest to the tip,
   wherein the raised portion has a thickness that is greater than the thickness of the upper strip, and/or
   wherein the raised portion has a height that is greater than the height of the upper strip.

6. The moulding unit according to claim 2, wherein the region of maximum thickness of the raised portion is offset in the longitudinal direction relative to at least one of the strips.

7. The moulding unit according to claim 2, wherein the raised portion is situated above the upper strip in the spanwise direction, and wherein the raised portion is spaced apart from the strips.

8. The moulding unit according to claim 1, wherein one of either the upstream portion or the downstream portion is made in one piece.

9. A method for manufacturing a turbomachine vane, comprising a step of casting a vane blank implemented in a moulding unit for producing a turbomachine vane blank,
   the vane blank comprising a blade extending in a so-called spanwise direction, the blade extending in a longitudinal direction from a leading edge as far as a trailing edge,
   the blade comprising a pressure-face side wall and a suction-face side wall which are spaced apart from each other in the running portion of the vane in a transverse direction, and wherein the pressure-face side wall and the suction-face side wall are each connecting the leading edge to the trailing edge, wherein at least one of the side walls is passed through at the level of the trailing edge by cooling slots which are spaced apart from each other in the spanwise direction, the blade comprising a tip which includes a cavity in the shape of a basin, wherein the cavity in the shape of a basin comprises a downstream opening passing through at least one of the side walls as far as the trailing edge, wherein the moulding unit has an upstream portion, a downstream portion and a raised portion rigidly securing the upstream portion to the downstream portion, wherein said raised portion is configured with a strengthening protuberance extending at least in the transverse direction in order to form the downstream opening once the vane has been manufactured.

* * * * *